US011017584B2

(12) United States Patent
Binder et al.

(10) Patent No.: US 11,017,584 B2
(45) Date of Patent: May 25, 2021

(54) METHOD FOR VISUALIZING AN IMAGE DATA SET, SYSTEM FOR VISUALIZING AN IMAGE DATA SET, COMPUTER PROGRAM PRODUCT AND A COMPUTER READABLE MEDIUM

(71) Applicant: Siemens Healthcare GmbH, Erlangen (DE)

(72) Inventors: Johannes Binder, Erlangen (DE); Klaus Engel, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/638,967

(22) PCT Filed: Jul. 30, 2018

(86) PCT No.: PCT/EP2018/070529
§ 371 (c)(1),
(2) Date: Feb. 13, 2020

(87) PCT Pub. No.: WO2019/038027
PCT Pub. Date: Feb. 28, 2019

(65) Prior Publication Data
US 2020/0226815 A1     Jul. 16, 2020

(30) Foreign Application Priority Data
Aug. 22, 2017   (EP) .................................. 17187200

(51) Int. Cl.
*G06T 17/00*      (2006.01)
*G06T 15/08*      (2011.01)

(52) U.S. Cl.
CPC .......... *G06T 15/08* (2013.01); *G06T 2210/41* (2013.01)

(58) Field of Classification Search
CPC ...... G06T 15/06; G06T 15/08; G06T 2210/41
See application file for complete search history.

(56) References Cited

U.S. PATENT DOCUMENTS

2002/0172409 A1* 11/2002 Saito ....................... G06T 15/08
382/132
2005/0151734 A1* 7/2005 Gubkin ................... G06T 9/001
345/424

(Continued)

FOREIGN PATENT DOCUMENTS

WO     WO 2016045701 A1     3/2016

OTHER PUBLICATIONS

Ropinski, Timo et al. "Visually Supporting Depth Perception in Angiography Imaging" International Symposium on Smart Graphics, Smart Graphics. SG 2006. Lecture Notes in Computer Science, vol. 4073, Springer, Berlin, Heidelberg // https://doi.org/10.1007/11795018_9 // Online ISBN: 978-3-540-36295-1, 2006.

(Continued)

*Primary Examiner* — Charles Tseng
(74) *Attorney, Agent, or Firm* — Harness, Dickey & Pierce, P.L.C.

(57) ABSTRACT

A method is for visualizing an image data set, the image data set displaying a three-dimensional arrangement including at least a first object and a second object. The method includes providing a three dimensional image data set including first voxels assigned to the first object and second voxels assigned to the second object; identifying first voxels of the three-dimensional image data set; determining a set of parameters for volume rendering, the set of parameters determined including a subset of parameters and a focusing parameter; identifying primary rays impacting on the first object and identifying secondary rays missing the first object; and performing the volume rendering using the subset of parameters determined, for visualizing the first (Continued)

object and the second object. The focusing parameter used for the primary rays in the volume rendering is different from the focusing parameter used for the secondary rays in the volume rendering.

24 Claims, 2 Drawing Sheets

(56) References Cited

U.S. PATENT DOCUMENTS

| | | | |
|---|---|---|---|
| 2009/0040220 A1* | 2/2009 | Gibbs | G06T 15/06 345/424 |
| 2010/0030064 A1* | 2/2010 | Averbuch | G06T 7/337 600/424 |
| 2011/0026793 A1* | 2/2011 | Goel | G06T 17/30 382/131 |
| 2017/0294042 A1 | 10/2017 | Engel | |
| 2018/0144214 A1* | 5/2018 | Hsieh | G06N 3/08 |

OTHER PUBLICATIONS

Sharifi, Amirali et al. "Using stochastic sampling to create depth-of-field effect in real-time direct volume rendering" Proceedings of Graphics Interface 2014: Montréal, Québec, Canada, May 7-9, 2014, pp. 77-85 // ISBN: 9781482260038 // DOI: 10.5555/2619648. 2619662.

Sathyanarayana, Karthik et al. "Generating highly realistic 3D animation video with depth-of-field and motion blur effects" Proceedings of SPIE (SPIE Optical Engineering + Applications, 2010, San Diego, California, United States) vol. 7798, Applications of Digital Image Processing XXXIII; 779818 (Sep. 7, 2010) // https://doi.org/10.1117/12.861339.

Svakhine, Nikolai A. et al. "Illustration-Inspired Depth Enhanced Volumetric Medical Visualization" IEEE Transactions on Visualization and Computer Graphics, vol. 15, No. 1, pp. 77-86, Jan.-Feb. 2009 (Date of Publication: Mar. 31, 2008) // DOI: 10.1109/TVCG. 2008.56.

Kosara, Robert "Semantic Depth of Field—Using Blur for Focus+ Context Visualization" PhD Thesis; Jan. 2002; pp. 1-88; Vienna—University of Technology; Austria.

Grosset, A. V. Pascal et al. "Evaluation of Depth of Field for depth perception in DVR" IEEE Pacific Visualization Symposium (PacificVis), Feb. 27-Mar. 1, 2013 // DOI: 10.1109/PacificVis.2013.6596131.

Kosara, Robert et al. "Semantic depth of field" Proceedings of the IEEE Symposium on Information Visualization 2001 (INFOVIS'01), Oct. 22-23, 2001 // DOI: 10.1109/INFVIS.2001.963286.

International Search Report PCT/ISA/210 for International Application No. PCT/EP2018/070529 dated Oct. 15, 2018.

Written Opinion of the International Searching Authority PCT/ISA/237 for International Application No. PCT/EP2018/070529 dated Oct. 15, 2018.

European Search Report for European Application No. EP17187200.5 dated Nov. 7, 2017.

European Office Action for European Application No. EP17187200.5 from European Patent Office dated Jan. 9, 2020.

Sharafi, Amir Ali; "Enhancing Visual Perception in Interactive Direct Volume Rendering of Medical Images"; 2016, University of Alberta—Department of Computer Science; pp. 1-151; DOI:10. 7939/r3th8bs7b.

European Office Action dated Nov. 17, 2020.

* cited by examiner

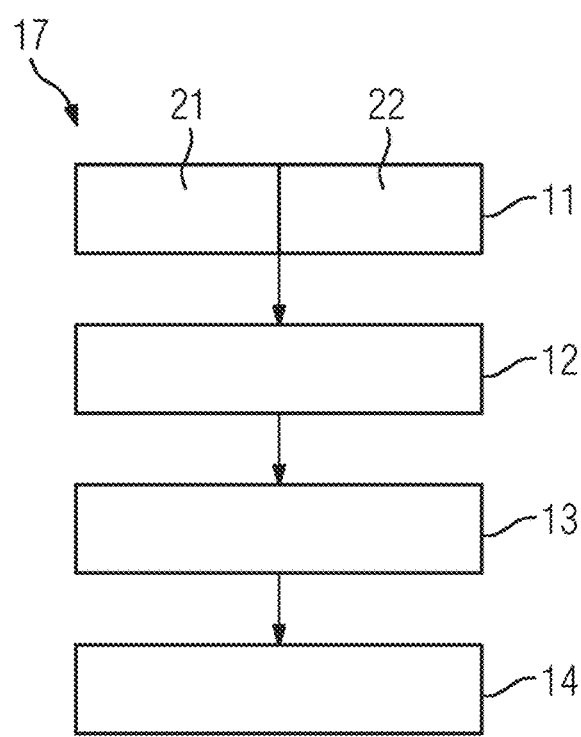
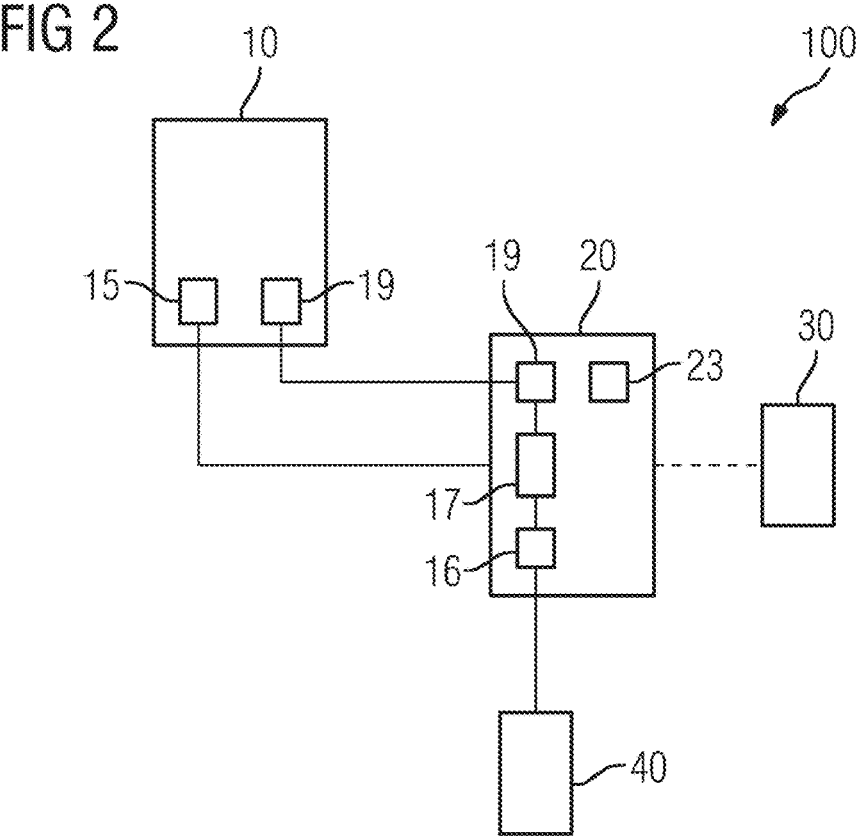

METHOD FOR VISUALIZING AN IMAGE DATA SET, SYSTEM FOR VISUALIZING AN IMAGE DATA SET, COMPUTER PROGRAM PRODUCT AND A COMPUTER READABLE MEDIUM

PRIORITY STATEMENT

This application is the national phase under 35 U.S.C. § 371 of PCT International Application No. PCT/EP2018/070529 which has an International filing date of Jul. 30, 2018, which designated the United States of America and which claims priority to European patent application no. EP 17187200.5 filed Aug. 22, 2017, the entire contents of each of which are hereby incorporated herein by reference.

FIELD

Embodiments of the invention generally relate to a method for visualizing an image data set, a system for visualizing an image data set, a computer program product and a computer readable medium.

In particular, in at least one embodiment the method deals with visualizing a medical image data set, preferably a three-dimensional (3D) or four-dimensional (4D) image data set, wherein the visualized data displays a three dimensional arrangement having a first object and a second object, such as organs, vessels and/or implants. For example, the medical image data sets are generated by computer tomography (CT) or magnetic resonance (MR). Volume visualization of such medical image data sets provides a means to review anatomy in 3D.

BACKGROUND

Powerful tools of volume visualization are volume rendering methods, such as a Monte Carlo path tracing method disclosed in WO 2016 045 701 A1. These methods allow displaying the first object and the second object depending on a common set of parameters, that for example classifies a camera position, a ray direction an opening angle and a focusing parameter such as an aperture size and a focal distance.

SUMMARY

The inventors have discovered that, in spite of the success of these visualization methods that allow a three dimensional visualization of objects, in particular organs, the visualized data shown on a display or screen contain an overwhelming amount of information such that it is hard for a user, such as a clinician, to handle all information.

At least one embodiment of the present invention provides an improved method for visualizing an image data set, in particular in order to simplify the handling of the displayed data for a user.

Embodiments of the present invention are directed to a method for visualizing an image data set, a system, a computer program product and a computer readable computer medium.

According to at least one embodiment of the present invention, a method for visualizing an image data set, in particular a medical image data set, is provided, wherein the visualized data set displays a three dimensional arrangement having at least a first object and a second object, comprising the steps:

providing a three dimensional image data set including first voxels being assigned to the first object and second voxels being assigned to the second object;
identifying first voxels of the three dimensional image data set;
determining a set of parameters for a volume rendering method, wherein the set of parameters includes a subset of parameters and a focusing parameter;
identifying primary rays that impact on the first object and secondary rays that miss the first object; and
performing the volume rendering method, in particular a path tracing method, using the subset of parameters for visualizing the first object and the second object, wherein the focusing parameter used for the primary rays in the volume rendering method is different from the focusing parameter used for the secondary rays in the volume rendering method.

Another embodiment of the present invention is directed to a system for visualizing an image data set, wherein the system is configured for providing a three dimensional image data set including first voxels being assigned to the first object and second voxels being assigned to the second object;
identifying first voxels of the three dimensional image data set;
determining a set of parameters for a volume rendering method, wherein the set of parameters includes a subset of parameters and a focusing parameter;
identifying primary rays that impact on the first object and secondary rays that miss the first object; and
performing the volume rendering method, in particular a path tracing method, using the subset of parameters for visualizing the first object and the second object, and
adapting the focusing parameter for the primary rays and the secondary rays.

A further embodiment of the present invention is directed to a computer program product for carrying out the steps of the method according to at least one embodiment of the present invention when the computer program product is loaded into a memory of a programmable device.

Further advantages and features will emerge from the following description of preferred embodiments of the method for analysing according to the invention with reference to the accompanying drawings. Individual features of the individual embodiments can be combined with one another here within the scope of the invention.

Another embodiment of the present invention is directed to a computer-readable medium on which is stored a program elements that can be read and executed by a computer unit in order to perform steps of the method according to the present invention when the program elements are executed by the computer unit.

Further advantages and features will emerge from the following description of preferred embodiments of the method for analysing according to the invention with reference to the accompanying drawings. Individual features of the individual embodiments can be combined with one another here within the scope of the invention.

BRIEF DESCRIPTION OF THE DRAWINGS

In the drawings:

FIG. 1 shows schematically a preferred embodiment of a method for visualizing an image data set according to the present invention, FIG. 2 shows a system for visualizing an image data set according to a preferred embodiment of the present invention, FIG. 3 illustration of the visualized data set by a method for visualizing an image data set according to a first embodiment of the present invention, and FIG. 4 illustration of the visualized data set by a method for visualizing an image data set according to a second embodiment of the present invention.

DETAILED DESCRIPTION OF THE EXAMPLE EMBODIMENTS

Figure 3:
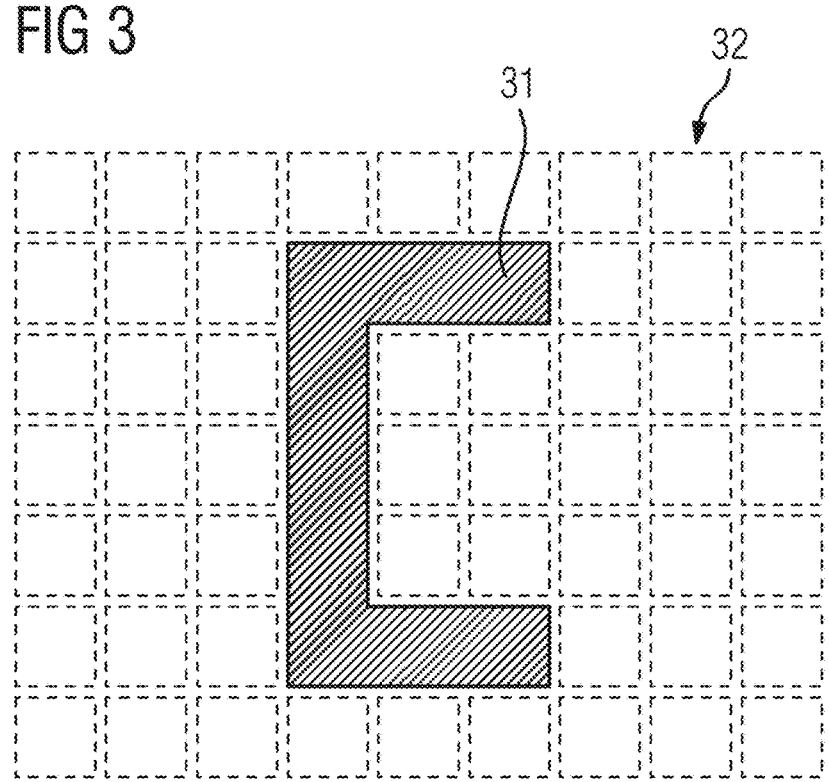

According to at least one embodiment of the present invention, a method for visualizing an image data set, in particular a medical image data set, is provided, wherein the visualized data set displays a three dimensional arrangement having at least a first object and a second object, comprising the steps:

providing a three dimensional image data set including first voxels being assigned to the first object and second voxels being assigned to the second object;

identifying first voxels of the three dimensional image data set;

determining a set of parameters for a volume rendering method, wherein the set of parameters includes a subset of parameters and a focusing parameter;

identifying primary rays that impact on the first object and secondary rays that miss the first object; and performing the volume rendering method, in particular a path tracing method, using the subset of parameters for visualizing the first object and the second object, wherein the focusing parameter used for the primary rays in the volume rendering method is different from the focusing parameter used for the secondary rays in the volume rendering method.

Contrary to the state of the art the focusing parameter used for the primary rays is different from the focusing parameter used for the second rays. Consequently, it is possible to present the first object and the second object such that they are focused differently, i.e. they are presented with different sharpness levels. For example a focused first object and a non-focused second object is displayed. Such a presentation assists the user in orientation and thus the user can easily identify relevant or specific parts of the visualized three-dimensional arrangement having at least the first object and the second object. Furthermore, it is possible establish an object related focusing in contrast to a plane orientated focusing as it is known by the state of the art, for in-stance by taking a picture with a camera. In other words: at least one embodiment of the present invention makes it possible to choose a focused presentation of the whole first object even when the first object extends over several planes the three dimensional arrangement. That means it is possible to display a focused outline of an object extending in three dimensions.

The term "image date set" represents preferably three dimensional (3D) image data sets or "four dimensional" (4D) image data sets. Furthermore, it is preferably provided, that the image data set is a medical image data set such as a data set generated by computer tomography (CT) or magnetic resonance (MR). Thereby, the data set comprises a density, i.e. a density value, for each volume element of the first object and the second object. The density might be a physical density, an optical density, a refraction index, an intensity-value, a color-value, a transparency-value and/or an opacity-value and might be presented as scalar value, vector or tensor.

In particular a voxel represents an element in a three dimensional array assigned to a specific volume element of the first object and/or the second object. Preferably, the first and the second object respectively extend in all three directions in space. For example, the first object represents an organ or a part of an organ. Preferably, the second object represents everything else besides the first object in the visualized image data set on a display. In particular, a processor or a network is provided for performing the method and the visualized data are presented on a screen, for example on a screen of a workstation, a tablet or a smartphone.

Preferably, the volume rendering method is the path tracing method disclosed WO 2016 045 701 A1 whose content explicitly is referred to in the context of volume rendering, the entire contents of which are hereby incorporated herein by reference. The term "subset of parameters" preferably includes camera parameters of the volume rendering method such as a camera position, an opening angle and/or a viewing direction. Furthermore, it is thinkable that a data set comprises a plurality of first objects and a plurality of second objects.

In particular, a visualization unit is provided, wherein the visualization unit comprises a processor being configured for executing the method according to at least one embodiment of the invention. For example, the visualization unit is included in the workstation of a medical imaging device recording the three dimensional image data set. Alternatively, the visualization unit is part of a server such as a cloud or a system of servers.

It is also thinkable that at least one step of the method according to at least one embodiment of the invention is performed at the server or the network. Thereby the visualization unit is in communication with the server or the network.

Furthermore, it is conceivable that the visualization unit is incorporated into a mobile unit such as a smartphone or tablet, or in means for generating a virtual reality. Preferably, the visualized data generated by the visualization unit are transferred to a display such as a screen, for example a screen of the smart phone, the tablet and/or the mean for generating the virtual reality. It is also thinkable that the visualized data sets are saved to a memory of the server for being available to the user or operator anytime.

Particularly advantageous embodiments and features of the invention are given by the dependent claims as revealed in the following description. Features of different claim categories may be combined as appropriate to give further embodiments not described herein.

According to a further embodiment of at least one embodiment of the present invention it is provided that the focusing parameter is adapted for a focused visualization of the first object. Consequently, the first object is focused, whereas the second object is not focused in the visualization of the three dimensional arrangement of the first object and the second object. That means the user, in particular the clinician, identifies the relevant first object comparatively fast. The second object or the second objects being less relevant are blurred and do not distract the user from the first object.

In a further embodiment, it is provided that the focusing parameter is an aperture size, wherein preferably the aperture size for the primary rays is set to zero in the volume rendering method, and/or that the focusing parameter is a focal distance, wherein preferably the focal distance for the primary rays is set to the distance to the first object in the volume rendering method. By setting the aperture size to zero for each primary ray or adapting the focal distance, it is possible to easily incorporate the proper focusing parameter into the volume rendering method.

Preferably, the aperture size of the secondary rays is set to a value different from zero, in particular depending on the distance to the primary ray, and/or the focal distance of the secondary rays is set to a global focal distance defined by the user, in particular depending on the distance to the primary rays. As a consequence, the second object is less focused than the first object. In particular, adapting the focusing parameter depending on the distance of the secondary ray to the primary ray allows modulating the image sharpness across the visualization of the three dimensional arrangement. For example second objects being located next to the first object are more focused than other second objects being located far away from the first object. Preferably, the focusing parameter for the secondary rays is modulated continuously for avoiding hard transitions of areas being focused and areas being not focused.

In a further embodiment, it is provided that the first voxels are classified in a three-dimensional array, wherein the three-dimensional array is transferred to a two-dimensional array classifying the primary rays and secondary rays. Thus, the two-dimensional array can be advantageously be used for choosing the proper focusing parameter in the volume rendering method. For transferring the three dimensional array to the two dimensional array it is preferably provided that the same subset of parameter is used as it is intended for the subsequent volume rendering method. This guarantees that the volume rendering method is performed such that the first object is focused and the second object is not focused. It is thinkable, that the aperture size is set to zero during the transfer of the three dimensional array to the two dimensional array. Preferably, the transfer of the three-dimension array to the two-dimensional array is performed by rendering the image data set in a two-dimensional framebuffer.

According to a preferred embodiment, it is provided that the focusing parameter is modified depending on the two-dimensional array. In particular the aperture size is set to zero for primary rays and set to a value different from zero for secondary rays. Preferably, the value of the focusing parameter for the secondary parameter is adapted based on the corresponding values in the two dimensional array. Thus, information included in the two-dimensional array can be used for modulating the focusing parameters for the secondary rays. Another advantage of using a two dimensional array is that the two dimensional array can be modified or manipulated timely before performing the volume rendering method. For example, the focusing parameter of specific second objects or areas can be chosen for causing an even more defocused presentation of the specific second objects.

Preferably, the first voxels are classified binary in a three-dimensional array, wherein the three-dimensional array is preferably transferred to the two-dimensional array by ray casting. As a consequence, the two dimensional array comprises the value "1" for primary rays and the value "0" for secondary rays. Thereby, it is preferably provided that the two-dimensional array is smoothed for avoiding hard transitions between the first object and the second object.

In another preferred embodiment it is provided that the first voxels are classified polygonal in a three-dimensional array. It is herewith advantageously possible to directly transfer the three dimensional array to the two dimensional array.

According to another preferred embodiment, it is provided that the first voxels are classified by a distance transformation in a three dimensional array, wherein the three-dimensional array is transferred to the two-dimensional array by ray marching. As a consequence, the values of the two-dimensional array are provided such that the values can be used directly for modulating the focusing parameter for the secondary rays. In particular, the focusing parameter is modulated such than the second objects being far away from the first object are less focused that those objects being close to the first object. As a consequence, a smooth transition between the first object and the second object can be realized by using the two dimensional array being result of the ray marching. Therefore there is advantageously no need for an additional smoothing or manipulation of the two dimensional array for realizing a smooth transition between the first object and the second object.

In a further preferred embodiment, it is provided that focusing parameters for the secondary rays are modulated for smoothing a transition area between the first object and the second object. Thus, hard transitions between the first object and the second object can be avoided. Preferably, the smoothing depends on the kind of classification of the first voxels in the three-dimensional array and/or the transfer mechanism transferring the three-dimensional array to the two-dimensional array. By adapting the smoothing process it is advantageously possible to use the proper mechanism to op-timize the transition between the first object and the second object.

Preferably, the two-dimensional array is at least partially smoothed, wherein preferably a gauss filter and/or a convolution operator for soft focusing is used for smoothing. Thus, it is possible to adapt or modify the two dimensional array timely before performing the volume rendering method.

In another embodiment, it is provided that the first voxels of the data set are identified automatically, preferably by a neuronal network. Preferably, the term "automatically" indicates that a sub-system is trained by a machine learning mechanism for selecting the proper first voxels, for selecting the classification and/or transferring the three-dimensional array to the two-dimensional array.

According to a preferred embodiment, it is provided that the first object is an aorta or a stent. By choosing the aorta as first object it is advantageously possible to improve the illustration of pathological changes, for example in the case of an aortic stenosis or aneurysma. The illustration might be used for planning an operation or for explaining a current situation to a patient. In particular, it is possible to precisely determine the location of a defect. Furthermore, the illustration shows a result of an operation. Other first objects might be a kidney, an urinary tract or vessels.

Another embodiment of the present invention is directed to a system for visualizing an image data set, wherein the system is configured for
    providing a three dimensional image data set including first voxels being assigned to the first object and second voxels being assigned to the second object;
    identifying first voxels of the three dimensional image data set;
    determining a set of parameters for a volume rendering method, wherein the set of parameters includes a subset of parameters and a focusing parameter;
    identifying primary rays that impact on the first object and secondary rays that miss the first object; and
    performing the volume rendering method, in particular a path tracing method, using the subset of parameters for visualizing the first object and the second object, and adapting the focusing parameter for the primary rays and the secondary rays.

A further embodiment of the present invention is directed to a computer program product for carrying out the steps of the method according to at least one embodiment of the present invention when the computer program product is loaded into a memory of a programmable device.

Another embodiment of the present invention is directed to a computer-readable medium on which is stored a program elements that can be read and executed by a computer unit in order to perform steps of the method according to the present invention when the program elements are executed by the computer unit.

Further advantages and features will emerge from the following description of preferred embodiments of the method for analysing according to the invention with reference to the accompanying drawings. Individual features of the individual embodiments can be combined with one another here within the scope of the invention.

In FIG. 1 a preferred embodiment of a method for visualizing an image data set according to the present invention is illustrated. In particular, the method refers to a method for visualizing an image data set, wherein the visualized data set 16 shows or displays a three dimensional arrangement of at least a first object 31 and a second object 32. Preferably, the image data set is a three dimensional image data set 19, in particular a medical three dimensional image data set, such as a data set generated by CT- or MR imaging. For example, the first object 31 and/or the second object 32 represents an organ or an implant. It is also thinkable that the first object 31 is a specific part of an organ and the second object 32 is another part of the same organ. Preferably, the second object 32 represents everything being not the first object 31 and being displayed in the three dimensional arrangements.

Essential step of visualizing the image data set is a volume rendering method 14, such as a path tracing method. For example, the volume rendering method 14 disclosed in WO 2016 045 701 A1, the entire contents of which are hereby incorporated herein by reference, is used for visualizing. By setting a global focusing parameter used in the volume rendering method it is possible to visualize the first object 31 and the second object 32 such that the first object 31 and the second object 32 are focused. Preferably, a set of parameters is selected or defined for the volume rendering method, wherein the set of parameters comprises a subset of parameters, such as a camera position, ray direction or an opening angle, as well as a focusing parameter, such as an aperture size and a focal distance. According to the present invention, it is intended to modify the method for visualizing the first object 31 and the second object 32 such that in the displayed visualization the first object 31 is focused and the second object 32 is not focused. Consequently, identifying the first object 31 in the visualization is simplified for a user, since the user can concentrate on the focused first object 31.

For establishing a focused first object 31 and a non-focused second object 32 simultaneously, in the beginning an image data set is provided, wherein the image data set comprises first voxels being assigned to the first object 31 and a second voxels being assigned to the second object 32. By using a segmentation 22 the first voxels are identified and in particular classified in a three-dimensional mask or array. For example, the first voxels are classified binary or polygonal. Preferably, a three-dimensional mask or array is generated for identifying the first voxels 11, wherein each element of the three-dimensional mask or array is associated to a corresponding classification value being result of the binary or polygonal classification. Subsequently, the three-dimensional mask is transformed to a two-dimensional mask or array, for example by a two-dimensional frame buffer using the set of parameters being intended for the volume rendering, for identifying primary rays 12 that impact on the first object 31. In the case of binary classification values a ray casting method is preferably used for transferring the three-dimensional mask to the two-dimensional mask. The three-dimensional mask using a polygonal classification can be transformed directly.

The two-dimensional mask or array identifies primary rays that impact on the first object 31 and secondary rays that miss the first object 31 depending on the set of parameters. Preferably, the primary rays are labelled with "1" and the secondary rays are labelled with "0". For avoiding hard transitions it is also thinkable to smooth the two-dimensional mask or array. The two-dimensional mask or array might be smoothed by using an image filter, such as a Gauss filter or a filter using convolution for soft focusing, at least in a transition area next to the elements of the two-dimensional mask or array assigned to the primary rays.

Alternatively, the first voxels are classified by a distance transformation 21. It is also thinkable that the two-dimensional mask is generated by ray marching from a three-dimensional array being result of a distance transformation. As a consequence, in the two-dimensional array or mask, a minimal distance to the first object 31 is saved. As a result, there is no need for smoothing the two-dimensional array or mask, since the smoothed transition in the two-dimensional array is generated automatically.

For visualization of the first object 31 and the second object 32, it is provided that the volume rendering method, in particular the path tracing method, is performed. In the volume rendering method 14 the subset of the previously selected or defined set of parameters is used. However, the focusing parameter is adapted for each ray, in particular for each primary and secondary ray. Preferably, the focusing parameter is an aperture size and the aperture size is set to "0" for each primary ray and is set to a value different from "0" for each secondary ray. As a consequence, the first object 31 is visualized focused while the second object 32 is visualized unfocused. For selecting the proper aperture size value the two-dimensional mask or array is used. For example, the values of the two-dimensional array are multiplied with a set aperture size. As a consequence, the values in the transition area cause a smoothed transition between the focused first object 31 and the non-focused second object 32. In other word: the values of the two-dimensional mask or array are used for modulating the focusing parameter, in particular the aperture size. Alternatively to the aperture size, the focal distance can be adapted for primary and secondary rays to achieve different focusing effects.

In FIG. 2 a system 100 for visualizing an image data set according to a preferred embodiment of the present invention is shown. In particular, the system comprises a medical imaging device 10, such as a computer tomography (CT) device or a magnetic resonance (MR) device. This medical imaging device 10 generates the three dimensional image data set 19 and transfers the three dimensional image data set 19 to a visualization unit 20 comprising a processor 23 being configured for visualizing 17 an image data set, in particular according to a method described in the context of FIG. 1. Furthermore, the medical imaging device 10 comprises an input unit 15 for configuring the visualization unit 20 by a user or operator, for example by choosing a smoothing parameter such as a proper filter, a desired degree of smoothing or a degree of focusing.

It also thinkable that the first object 31 is specified or chosen by the operator via the input unit 15. Moreover, it is provided that the visualization unit 20 is in communication with a server 30, for example by using the server 30 or a server system for performing at least one of the steps of the method described above. For instance, the server 30 and/or the 30 server system are used for identifying the first voxels. It is also conceivable that the visualization unit 20 is part of the server 30 or the server system. The server 30 or the server system preferably forms a network or a cloud. Alternatively, it is also thinkable that the visualization unit 20 is incorporated into the medical imaging device 10 and is in communication with the server on demand. Furthermore, it is provided that after visualization a visualized data set 16 is transferred to a display 40, such as a screen of a workstation, a tablet, a smartphone or the like, for displaying the visualized data set 16.

Figure 4:
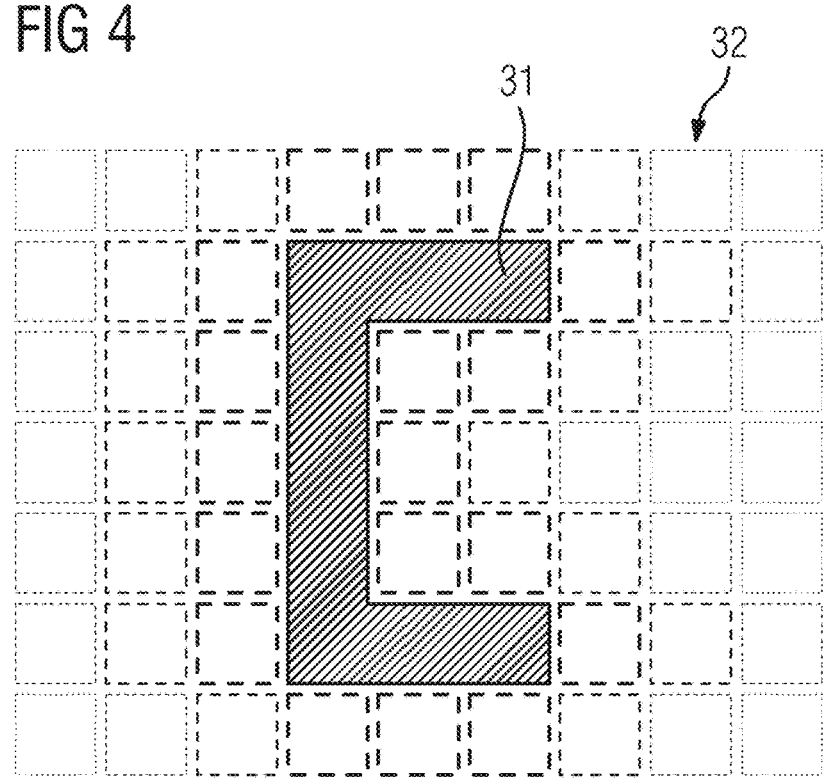

In FIGS. 3 and 4 illustration of the visualized data set by a method for visualizing an image data set are shown. For sake of simplicity instead of a three dimensional arrangement a two dimensional arrangement is shown. The first object 31 is represented by the filled squares, whereas the empty squares forms the second object 32. Further the thickness of the lines represents the degree of focusing, i.e. the degree of focusing decreases with decreasing line width limiting the empty squares. In FIG. 3a the filled squares 31 represents a focused visualization leading to a sharp contour of the first object 31. The empty squares forming the second object 32 have the same degree of focusing but are less focused than the first object 31. In contrast to the FIG. 3a the empty squares of FIG. 3b do not have the same degree of focusing but are still less focused than the first object 31. In particular, the degree of focusing decreases with increasing distance from the first object 31. Thus, a smooth transition from the first object 31 to the second object 32 is realized.

The invention claimed is:

1. A method for visualizing an image data set, the image data set displaying a three-dimensional arrangement including at least a first object and a second object, the method comprising:
   providing a three-dimensional image data set including first voxels assigned to the first object and second voxels assigned to the second object;
   identifying the first voxels of the three-dimensional image data set;
   determining a set of parameters for volume rendering, the set of parameters determined including a subset of parameters and a focusing parameter;
   identifying primary rays impacting on the first object and identifying secondary rays missing the first object; and
   performing the volume rendering using the subset of parameters determined, for visualizing the first object and the second object,
   wherein the focusing parameter used for the primary rays in the volume rendering is different from the focusing parameter used for the secondary rays in the volume rendering, and
   wherein the focusing parameter used for the secondary rays is modulated for smoothing a transition area between the first object and the second object.

2. The method of claim 1, wherein the focusing parameter is adapted for a focused visualization of the first object.

3. The method of claim 2, wherein at least one of
   the focusing parameter is an aperture size and
   the focusing parameter is a focal distance.

4. The method of claim 3, wherein at least one of
   the aperture size of the secondary rays is set to a value different from zero, and
   the focal distance of the secondary rays is set to a global focal distance defined by a user.

5. The method of claim 1, wherein at least one of
   the focusing parameter is an aperture size and
   the focusing parameter is a focal distance.

6. The method of claim 5, wherein at least one of
   the aperture size of the secondary rays is set to a value different from zero, and
   the focal distance of the secondary rays is set to a global focal distance defined by a user.

7. The method of claim 5, wherein at least one of
   the aperture size for the primary rays is set to zero in the volume rendering and
   the focal distance for the primary rays is set to a distance to the first object in the volume rendering.

8. The method of claim 1, wherein the first voxels are classified in a three-dimensional array, and wherein the three-dimensional array is transferred to a two-dimensional array classifying the primary rays and secondary rays.

9. The method of claim 8, wherein the focusing parameter is modified depending on the two-dimensional array.

10. The method of claim 1, wherein the first voxels are classified binary in a three-dimensional array.

11. The method of claim 10, wherein the three-dimensional array is transferred to a two-dimensional array by ray casting.

12. The method of claim 1, wherein the first voxels are classified polygonal in a three-dimensional array.

13. The method of claim 1, wherein the first voxels are classified by a distance transformation in a three dimensional array, and wherein the three-dimensional array is transferred to a two-dimensional array by ray marching.

14. The method of claim 1, wherein a two-dimensional array is at least partially smoothed.

15. The method of claim 14, wherein at least one of a gauss filter and a convolution operator for soft focusing is used for smoothing.

16. The method of claim 1, wherein the first voxels of the three-dimensional image data set are identified automatically.

17. The method of claim 16, wherein the first voxels of the three-dimensional image data set are identified automatically, by a neuronal network.

18. The method of claim 1, wherein the volume rendering includes a path tracing method.

19. A non-transitory computer program product storing a computer program for carrying out the method of claim 1 when the computer program is loaded into a memory of a programmable device and executed by the programmable device.

20. A non-transitory computer-readable medium, storing program elements, readable and executable by a computer unit to perform the method of claim 1 when the program elements are executed by the computer unit.

21. A system for visualizing an image data set, the image data set displaying a three-dimensional arrangement including at least a first object and a second object and the system receiving a three-dimensional image data set, including first voxels assigned to the first object and second voxels assigned to the second object, the system comprising:
   at least one processor, and
   a memory storing a computer program for execution by the at least one processor, the at least one processor, upon execution of the computer program, being configured to:

identify the first voxels of the three-dimensional image data set;

determine a set of parameters for a volume rendering, wherein the set of parameters includes a subset of parameters and a focusing parameter;

identify primary rays impacting on the first object and identify secondary rays missing the first object; and perform the volume rendering using the subset of parameters for visualizing the first object and the second object, and adapting the focusing parameter for the primary rays and the focusing parameter for the secondary rays, wherein the focusing parameter used for the primary rays in the volume rendering is different from the focusing parameter used for the secondary rays in the volume rendering, and wherein the focusing parameter used for the secondary rays is modulated for smoothing a transition area between the first object and the second object.

22. The system of claim 21, wherein the volume rendering includes a path tracing method.

23. A method for visualizing an image data set, the image data set displaying a three-dimensional arrangement including at least a first object and a second object, the method comprising:

providing a three-dimensional image data set including first voxels assigned to the first object and second voxels assigned to the second object;

identifying the first voxels of the three-dimensional image data set;

determining a set of parameters for volume rendering, the set of parameters determined including a subset of parameters and a focusing parameter;

identifying primary rays impacting on the first object and identifying secondary rays missing the first object; and performing the volume rendering using the subset of parameters determined, for visualizing the first object and the second object, wherein the focusing parameter used for the primary rays in the volume rendering is different from the focusing parameter used for the secondary rays in the volume rendering, wherein at least one of
the focusing parameter is an aperture size and
the focusing parameter is a focal distance, wherein at least one of
the aperture size of the secondary rays is set to a value different from zero, and
the focal distance of the secondary rays is set to a global focal distance defined by a user, and wherein at least one of
the aperture size of the secondary rays is set to the value different from zero, depending on a distance to the primary rays, and
the focal distance of the secondary rays is set to the global focal distance defined by the user, depending on the distance to the primary rays.

24. A system for visualizing an image data set, the image data set displaying a three-dimensional arrangement including at least a first object and a second object and the system receiving a three-dimensional image data set, including first voxels assigned to the first object and second voxels assigned to the second object, the system comprising:

at least one processor, and a memory storing a computer program for execution by the at least one processor, the at least one processor, upon execution of the computer program, being configured to:

identify the first voxels of the three-dimensional image data set;

determine a set of parameters for a volume rendering, wherein the set of parameters includes a subset of parameters and a focusing parameter;

identify primary rays impacting on the first object and identify secondary rays missing the first object; and perform the volume rendering using the subset of parameters for visualizing the first object and the second object, and adapting the focusing parameter for the primary rays and the focusing parameter for the secondary rays, wherein the focusing parameter used for the primary rays in the volume rendering is different from the focusing parameter used for the secondary rays in the volume rendering, wherein at least one of
the focusing parameter is an aperture size and
the focusing parameter is a focal distance, wherein at least one of
the aperture size of the secondary rays is set to a value different from zero, and
the focal distance of the secondary rays is set to a global focal distance defined by a user, and wherein at least one of
the aperture size of the secondary rays is set to the value different from zero, depending on a distance to the primary rays, and
the focal distance of the secondary rays is set to the global focal distance defined by the user, depending on the distance to the primary rays.

* * * * *